L. S. HAYDEN.
EXTENSION BORING BIT.
APPLICATION FILED MAY 31, 1921.
1,398,780.
Patented Nov. 29, 1921.
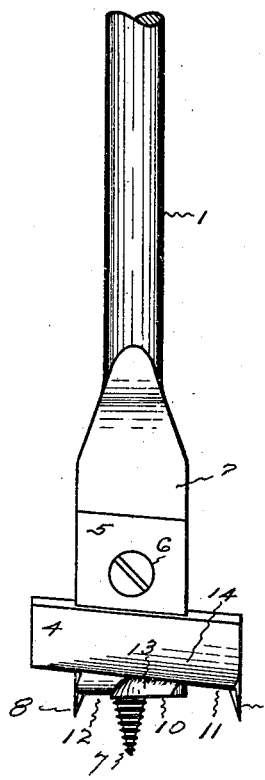
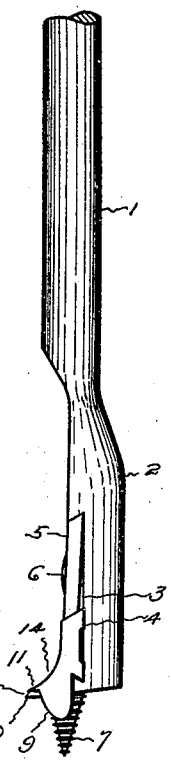
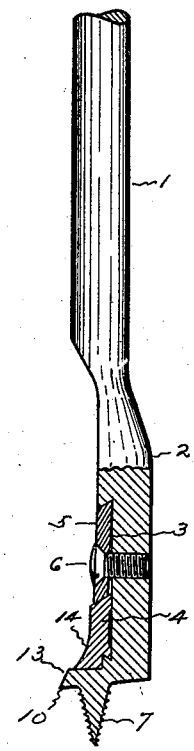
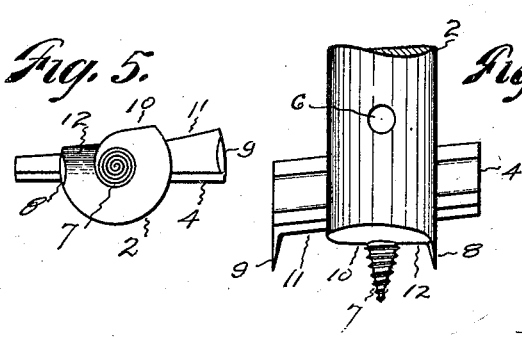
Inventor
Louis S. Hayden
Harry P. Williams
Attorney

UNITED STATES PATENT OFFICE.

LOUIS S. HAYDEN, OF ESSEX, CONNECTICUT, ASSIGNOR TO THE CONNECTICUT VALLEY MANUFACTURING COMPANY, OF CENTERBROOK, CONNECTICUT, A CORPORATION.

EXTENSION BORING-BIT.

1,398,780.          Specification of Letters Patent.      Patented Nov. 29, 1921.

Application filed May 31, 1921. Serial No. 473,625.

*To all whom it may concern:*

Be it known that I, LOUIS S. HAYDEN, a citizen of the United States, residing at Essex, in the county of Middlesex and State of Connecticut, have invented a new and useful Improvement in Extension Boring-Bits, of which the following is a specification.

This invention relates to the class of wood boring tools known as extension bits, that is, those tools which are shaped so that they can be used to bore a hole of minimum size or can be provided with an extension blade that may be adjusted for boring different sizes of holes larger than the hole produced by the bit proper.

The object of the invention is to provide a tool of this type which is simple to manufacture and easy to sharpen and which will clear itself freely and not clog with chips and draw out the feed screw but will cut a clean hole of the required size with a minimum expenditure of power.

This object is attained by the particular formation of the cuttting lip and clearance throat of the bit proper and the coaction of the same with the extension blade whereby the chips cut by the bit are directed out of the hole bored in such manner that they will not clog and interfere with the action of the cutting lip of the blade.

In the accompanying drawings, Figure 1 shows a front elevation of a bit that is formed according to this invention. Fig. 2 is a side elevation of the same. Fig. 3 shows a side elevation with a portion cut in central section. Fig. 4 shows a back elevation. Fig. 5 shows an end view.

The shank 1 of the bit is of ordinary shape and the head 2 is provided with the usual transverse mortise 3 in which the angularly arranged extension blade 4, the extension blade clamp plate 5 and clamp plate binding screw 6 are located in the manner common to this type of tools. Projecting down from the center of the end of the head of the bit proper is the common form of feed screw 7, and projecting down from one side of the head is the usual boundary cutting spur 8. The end of the lowest side of the extension blade has its usual boundary cutting spur 9. The spur 8 on the head of the bit and the spur 9 on the end of the extension blade are on diametrically opposite sides of the tool, the former defining the boundary of the smaller cut made by the bit proper and the latter defining the boundary of the larger bore made by the extension blade. In this tool the end of the head is ground so that the cutting lip 10 of the bit proper extends out from the feed screw nearly at right angles to the axis of the tool below and just a little in front of but substantially parallel with the cutting lip 11 of the extension blade so that the lips will make independent cuts when boring wood, the cut made by the lip 10 being in advance of the cut made by the lip 11.

The end of the head of the bit between the feed screw and the spur 8 is ground away on an incline so as to form a wide throat 12 without any overhanging section such as would obstruct the passage and clog with chips cut by the bit. The angle on the upper or land side 13 of the cutting lip of the bit is formed steeper or more blunt than the angle of the cutting lip of the extension blade below the curved surface 14 of the blade, so as to deflect the chips cut by the bit over the joint at the lower edge of the blade and onto the curved section of the blade where they cannot clog but will be free to pass up and out of the hole bored.

With this tool there is no constricted throat which can clog with chips. The chips are discharged freely through the hole bored. The bit proper can be used alone to bore a perfect hole, or it may be provided with the extension blade to form a larger hole of the required size. When the extension blade is used the bit and the blade make independent cuts without the chips of one interfering with the chips of the other cut. The bit is simple to make and can be easily sharpened and resharpened by anyone as there are no undercuts or constricted throats such as are found in the common bits of this character so long in general use. As the boundary spurs are upon opposite sides of the feed screw, the tool bores a straight hole of exact size although all of the cutting is done on one side of the feed screw.

The invention claimed is:

1. A boring bit having a head with a feed screw extending from the axis of the head, a spur extending from the periphery of the head on one side with a recess between said spur and feed screw constituting an unconstricted throat between the feed screw and the spur, a cutting lip extending at substantially right angles to the axis from the feed screw to the periphery of the head on the opposite side of the axis from said spur, an oblique mortise in the head above said cutting lip, and an extension blade with a cutting lip clamped in said mortise, said blade having a spur at its end on the opposite side of the axis from the spur on the head, the two cutting lips being on the same side of the axis whereby a restricted throat is avoided.

2. A boring bit having a head with a feed screw extending from the axis of the head, a spur extending from the periphery of the head on one side with a recess between said spur and feed screw constituting an unconstricted throat between the feed screw and the spur, a cutting lip extending at substantially right angles to the axis from the feed screw to the periphery of the head on the opposite side of the axis from said spur, an oblique mortise in the head above said cutting lip, and an extension blade with a cutting lip clamped in said mortise, the angle of the land side of the cutting lip on the head being more blunt or steeper than the angle of the cutting lip of the blade above said cutting lip on the head so as to direct chips formed by the head cutting lip over the joint between the blade cutting lip and the head cutting lip.

3. A boring bit having a head with a mortise, an extension blade clamped in said mortise, said blade having a spur at one end, a feed screw extending from the axis of the head, a spur extending from the periphery of the head on the opposite side of the axis from the spur at the end of the extension blade, with an open unconstricted recess between the feed screw and the spur on the head, and a cutting lip extending from the feed screw to the periphery of the head in advance of and substantially parallel with the cutting lip of the extension blade, said cutting lips being on the same side of the axis of the bit.

LOUIS S. HAYDEN.